(12) United States Patent
Liu et al.

(10) Patent No.: US 11,513,384 B2
(45) Date of Patent: Nov. 29, 2022

(54) BLACK MATRIX STRUCTURE, METHOD FOR MANUFACTURING SAME, DISPLAY SUBSTRATE, AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Hong Liu, Beijing (CN); Jingyi Xu, Beijing (CN); Peng Liu, Beijing (CN); Yongqiang Zhang, Beijing (CN); Bo Li, Beijing (CN); Peirong Huo, Beijing (CN)

(73) Assignees: ORDOS YUANSHENG OPTOELECTRONICS CO., LTD., Inner Mongolia (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/228,811

(22) Filed: Apr. 13, 2021

(65) Prior Publication Data
US 2022/0100028 A1 Mar. 31, 2022

(30) Foreign Application Priority Data
Sep. 30, 2020 (CN) .......................... 202011064189.2

(51) Int. Cl.
*G02F 1/1335* (2006.01)
(52) U.S. Cl.
CPC .. *G02F 1/133512* (2013.01); *G02F 1/133516* (2013.01)

(58) Field of Classification Search
None
See application file for complete search history.

(56) References Cited

U.S. PATENT DOCUMENTS

| 2004/0140516 A1* | 7/2004 | Yoshikawa | B32B 3/00 257/437 |
|---|---|---|---|
| 2015/0340412 A1* | 11/2015 | Lee | H01L 51/5268 438/34 |
| 2016/0017168 A1 | 1/2016 | Korchev et al. | |
| 2019/0324332 A1 | 10/2019 | Kang et al. | |
| 2019/0361290 A1 | 11/2019 | Li | |

FOREIGN PATENT DOCUMENTS

| CN | 1205489 C | * | 6/2005 | ............. G02B 5/201 |
| CN | 108303817 A | | 7/2018 | |
| CN | 109239815 A1 | | 1/2019 | |
| KR | 20070017710 A | * | 2/2007 | |
| KR | 101772783 B1 | | 8/2017 | |

OTHER PUBLICATIONS

Novelty search report dated Jun. 12, 2020.

* cited by examiner

*Primary Examiner* — Shan Liu
(74) *Attorney, Agent, or Firm* — Fay Sharpe LLP

(57) ABSTRACT

Provided is a black matrix structure including a plurality of crossed black matrix strips. A side surface of the black matrix strip has a roughness less than 2 μm and is intersected with a reference plane. The reference plane being parallel to a plane defined by crossing of the plurality of black matrix strips.

18 Claims, 10 Drawing Sheets

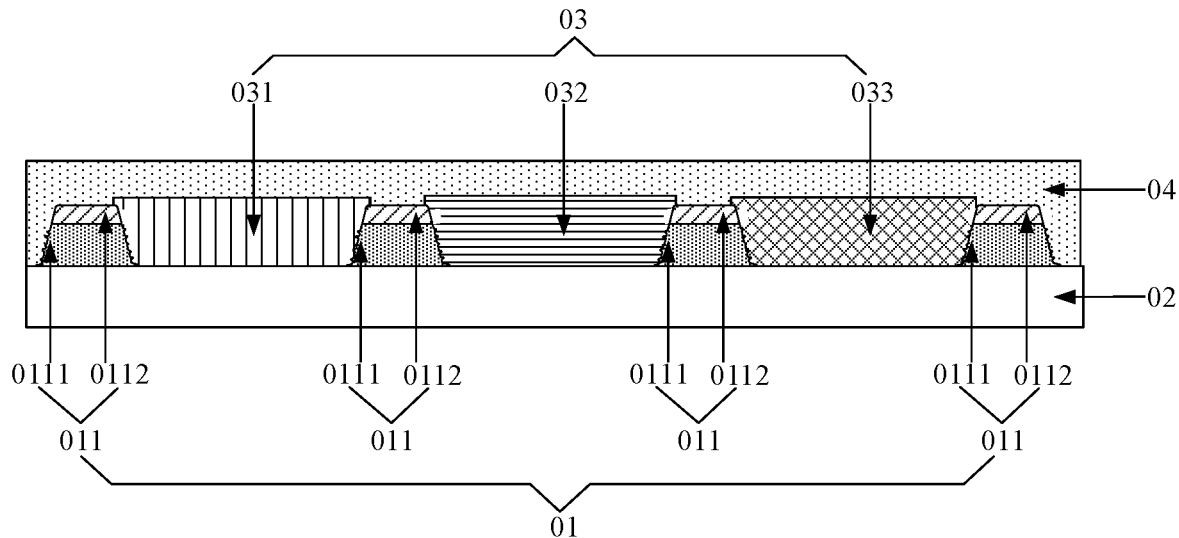

FIG. 8

Forming an initial black matrix structure on a base substrate, wherein the initial black matrix structure includes a plurality of crossed initial black matrix strips, and the initial black matrix strip includes a black matrix body and a burr structure protruding from a side of the black matrix body in a direction distal from the black matrix body — 901

Removing at least part of the burr structure of the initial black matrix strip in the initial black matrix structure to acquire the black matrix structure — 902

FIG. 9

BLACK MATRIX STRUCTURE, METHOD FOR MANUFACTURING SAME, DISPLAY SUBSTRATE, AND DISPLAY DEVICE

CROSS REFERENCE TO RELATED APPLICATIONS

This application is based on and claims priority to Chinese Patent Application No. 202011064189.2, filed on Sep. 30, 2020 and entitled "BLACK MATRIX STRUCTURE, METHOD FOR MANUFACTURING SAME, DISPLAY SUBSTRATE, AND DISPLAY DEVICE," the disclosure of which is herein incorporated by reference in its entirety.

TECHNICAL FIELD

The present disclosure relates to a black matrix structure, a method for manufacturing the same, a display substrate, and a display device.

BACKGROUND

A color filter substrate in a display device includes a base substrate, a black matrix (BM) structure composed of a plurality of black matrix strips that are crossed on the base substrate, and a filter structure in an opening area of the black matrix structure. The black matrix strip is configured to block light and thereby prevent the light rays passing through different filter structures from interfering each other.

SUMMARY

Embodiments of the present disclosure provide a black matrix structure, a method for manufacturing the same, a display substrate, and a display device.

In a first aspect of the embodiments of the present disclosure, a black matrix structure is provided. The black matrix structure includes a plurality of crossed black matrix strips.

A side surface of the black matrix strip has a roughness less than 2 μm and is intersected with a reference plane, wherein the reference plane is parallel to a plane defined by crossing of the plurality of black matrix strips.

In some embodiments, the black matrix strip is a laminated structure formed by superimposing a light shielding strip and a protective dielectric strip, wherein an orthographic projection of the protective dielectric strip on the reference plane is within an orthographic projection of the light shielding strip on the reference plane.

In some embodiments, a material of the protective dielectric strip includes one of silicon oxide, silicon nitride, or silicon oxynitride, or any combination thereof.

In some embodiments, a ramp angle of the black matrix strip ranges from 70 degrees to 80 degrees.

In some embodiments, a first cross section of the black matrix strip is in a shape of a chamfered isosceles trapezoid, wherein a vertex angle of the chamfered isosceles trapezoid is a circular arc chamfer and is an angle between an upper base of the chamfered isosceles trapezoid and a leg of the chamfered isosceles trapezoid, and the first cross section is parallel to a widthwise direction of the black matrix strip and perpendicular to a lengthwise direction of the black matrix strip.

In some embodiments, the vertex angle of the chamfered isosceles trapezoid ranges from 120 degrees to 130 degrees.

In a second aspect of the embodiments of the present disclosure, a display substrate is provided. The display substrate includes: a base substrate; a black matrix structure on the base substrate, wherein the black matrix structure includes a plurality of crossed black matrix strips, and a side surface of the black matrix strip has a roughness less than 2 μm and is intersected with a panel surface of the base substrate; a color filter layer on the base substrate, wherein a filter structure of the color filter layer is disposed in an opening area of the black matrix structure; and a protective layer on a side of the color filter layer distal from the base substrate.

In some embodiments, the black matrix strip is a laminated structure formed by superimposing a light shielding strip and a protective dielectric strip, wherein orthographic projection of the protective dielectric strip on the base substrate is within an orthographic projection of the light shielding strip on the base substrate, and the light shielding strip is disposed between the protective dielectric strip and the base substrate.

In some embodiments, a material of the protective dielectric strip includes one of silicon oxide, silicon nitride, or silicon oxynitride, or any combination thereof.

In some embodiments, a ramp angle of the black matrix strip ranges from 70 degrees to 80 degrees.

In some embodiments, a first cross section of the black matrix strip is in a shape of a chamfered isosceles trapezoid, a vertex angle of the chamfered isosceles trapezoid is a circular arc chamfer and is an angle between an upper base of the chamfered isosceles trapezoid and a leg of the chamfered isosceles trapezoid, wherein the first cross section is parallel to a widthwise direction of the black matrix strip and perpendicular to a lengthwise direction of the black matrix strip.

In some embodiments, the vertex angle of the chamfered isosceles trapezoid ranges from 120 degrees to 130 degrees.

In a third aspect of the embodiments of the present disclosure, a display device is provided. The display device includes the display substrate according to the second aspect or any optional embodiment of the second aspect.

In a fourth aspect, a method for manufacturing a black matrix structure is provided. The method includes: forming an initial black matrix structure on a base substrate, wherein the initial black matrix structure includes a plurality of crossed initial black matrix strips, and the initial black matrix strip includes a black matrix body and a burr structure protruding from a side of the black matrix body in a direction distal from the black matrix body; and removing at least part of the burr structure of the initial black matrix strip in the initial black matrix structure to acquire the black matrix structure, wherein the black matrix structure includes a plurality of crossed black matrix strips, and a side surface of the black matrix strip has a roughness less than 2 μm and is intersected with a panel surface of the base substrate.

In some embodiments, removing at least part of the burr structures of the initial black matrix strips in the initial black matrix structure to acquire the black matrix structure includes: forming a protective dielectric layer on a side of the initial black matrix structure distal from the base substrate; and etching the burr structures of the plurality of initial black matrix strips by a mask manufactured on a side of the protective dielectric layer distal from the initial black matrix structure, thereby removing at least part of the burr structures to acquire a plurality of light shielding strips.

In some embodiments, at least one first opening is defined by crossing of the plurality of initial black matrix strips, and the mask includes at least one second opening, wherein the at least one second opening one-to-one corresponds to the at least one first opening and the second opening has a size greater than the first opening, and a distance between a boundary of each second opening and a boundary of a corresponding first opening ranges from 0.5 μm to 2 μm.

In some embodiments, the burr structures of the plurality of initial black matrix strips are etched by a dry etching process.

In some embodiments, the burr structures of the plurality of initial black matrix strips are etched by taking a mixed gas of sulfur fluoride gas and oxygen gas as an etching gas.

In some embodiments, etching the burr structures of the plurality of initial black matrix strips by the mask manufactured on the side of the protective dielectric layer distal from the initial black matrix structure includes: forming a photoresist pattern on the side of the protective dielectric layer distal from the initial black matrix structure, the photoresist pattern including a plurality of crossed photoresist strips; over-etching the protective dielectric layer and the initial black matrix structure by taking the photoresist pattern as the mask, thereby removing at least part of the burr structures of the plurality of initial black matrix strips to acquire the plurality of light shielding strips; and removing the photoresist pattern.

In some embodiments, forming the protective dielectric layer on the side of the initial black matrix structure distal from the base substrate includes: forming the protective dielectric layer by an evaporation process on the side of the initial black matrix structure distal from the base substrate at a preset evaporation temperature, the preset evaporation temperature ranging from 210° C. to 230° C.

In some embodiments, the black matrix strip is a laminated structure formed by superimposing a light shielding strip and a protective dielectric strip, wherein an orthographic projection of the protective dielectric strip on the base substrate is within an orthographic projection of the light shielding strip on the base substrate, and the light shielding strip is disposed between the protective dielectric strip and the base substrate.

In some embodiments, a material of the protective dielectric strip includes one of silicon oxide, silicon nitride, or silicon oxynitride, or any combination thereof.

In some embodiments, a ramp angle of the black matrix strip ranges from 70 degrees to 80 degrees.

In some embodiments, a first cross section of the black matrix strip is in a shape of a chamfered isosceles trapezoid, wherein a vertex angle of the chamfered isosceles trapezoid is a circular arc chamfer and is an angle between an upper base of the chamfered isosceles trapezoid and a leg of the chamfered isosceles trapezoid, and the first cross section is parallel to a widthwise direction of the black matrix strip and perpendicular to a lengthwise direction of the black matrix strip.

In some embodiments, the vertex angle of the chamfered isosceles trapezoid ranges from 120 degrees to 130 degrees.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

FIG. 8 is a schematic structural diagram of a display substrate according to an embodiment of the present disclosure;

FIG. 9 is a flowchart of a method for manufacturing a black matrix structure according to an embodiment of the present disclosure;

Figure 1:
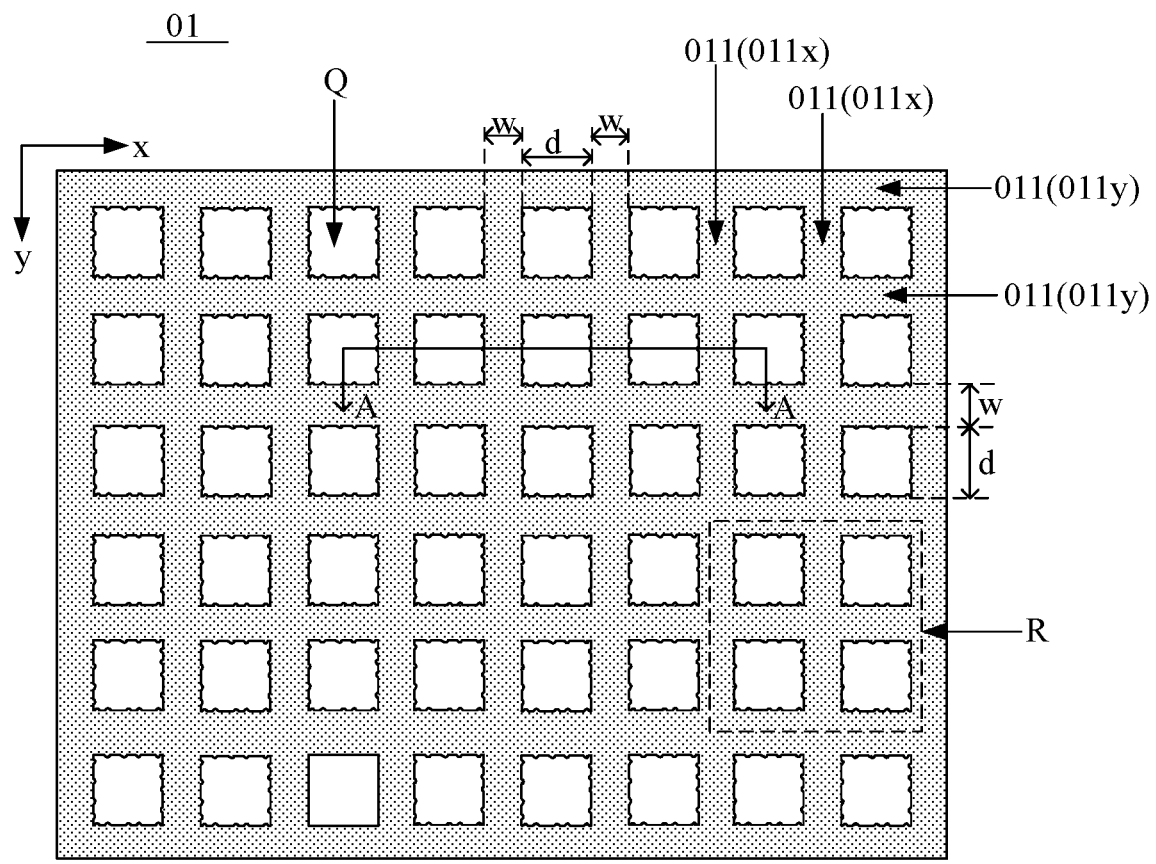
FIG. 1 is a front view of a black matrix structure according to an embodiment of the present disclosure.

The drawings herein are incorporated in and constitute a part of the specification. They show the embodiments consistent with the present disclosure and are used in conjunction with the specification to explain the principles of the present disclosure.

DETAILED DESCRIPTION

In order to make principles, technical solutions and advantageous of the present disclosure more clearly, the present disclosure are described in detail hereinafter with reference to drawings. It is obvious that the described embodiments are only a part of embodiments of the present disclosure, not all embodiments of the present disclosure. All the other embodiments achieved by those of ordinary skills in the art, based on the embodiments of the present disclosure without creative work, shall fall within the protection scope of the present disclosure.

A color filter substrate in a display device includes a black matrix structure composed of a plurality of crossed black matrix strips. The black matrix strips are used to block light, avoid light leakage of sub-pixels in the display device, prevent sub-pixels of different colors from mixing, and enhance color contrast of the display device. Thus, the black matrix structure matters a lot to the display effect of the display device.

At present, the black matrix structure is manufactured mainly by an exposure process and a development process. Affected by the manufacturing process, the black matrix strip may have a burr structure on the side surface, and the burr structure has a relatively great height, which causes that the black matrix strip has a relatively large roughness in the side surface. Thus, the sub-pixels may have defects of displaying black edges or the like, and the display device thereby has a low yield. Especially with the development of virtual reality (VR) technologies, users have a higher and higher requirement for the quality of VR devices. However, the burr structure on the side surface of the black matrix strip may cause the VR devices to have problems such as visual stains, decreased contrast, and optical abnormalities, which may seriously affect the yield rate of VR devices and causes the VR device to have a defective rate as high as 100%. Therefore, the current black matrix structure is unsuitable for the display devices having a high requirement in quality such as VR devices. The height of the burr structure refers to a distance between the side surface of the black matrix strip and the side of the burr structure distal from the side surface of the black matrix strip.

In an exemplary embodiment, while manufacturing the black matrix structure at present, a black matrix film is formed firstly. Then, the black matrix film is exposed by an exposure process, and the black matrix structure is acquired by developing the exposed black matrix film. However, while developing the exposed black matrix film, the developing solution has the same developing rate for the black matrix film in all directions and is characterized as isotropy of the development. As a result, in the black matrix structure acquired after the development, the side surface of the black matrix strip is developed into grooves and thereby uneven, which causes the black matrix strip to have a burr structure on the side surface and may also easily cause that the part which needs to be removed on the black matrix film is remained and the ramp angle of the black matrix strip is small. Furthermore, the fluctuation in the temperature and concentration of the developing solution may also cause the side surface of the black matrix strip to be uneven and unsmooth, which thereby affects the display effect.

In view of this, embodiments of the present disclosure provide a black matrix structure, a method for manufacturing the same, a display substrate, and a display device. In the black matrix structure according to embodiments of the present disclosure, the roughness of the side surface of the black matrix strip is less than 2 μm. Thus, the roughness of the side surface of the black matrix strip is relatively small, which helps to improve the display effect of the display device and enables the black matrix structure to be applied to display devices having a high requirement in resolution. For example, the black matrix structure may be applied to a VR device to improve the visual clarity of the VR device, increase the contrast of the VR device, and avoid optical anomalies and the like, thereby helping improve the yield of the VR device. The technical solutions according to embodiments of the present disclosure are illustrated in detail in combination with the accompanying drawings hereinafter.

Figure 2:
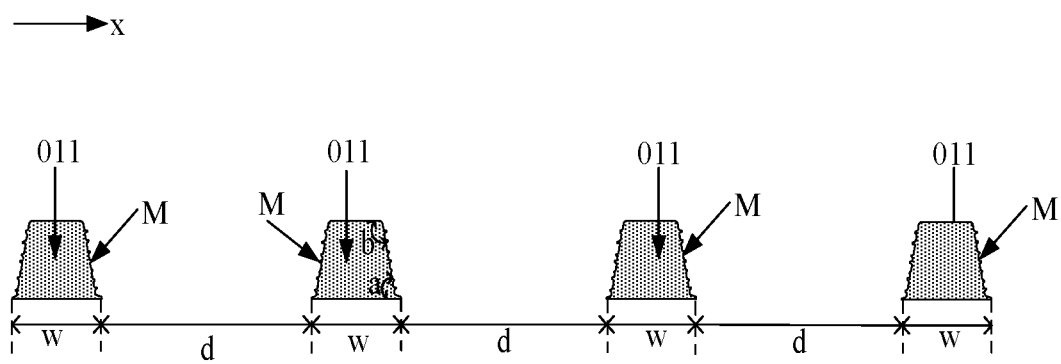
FIG. 2 is a cross-sectional view of a black matrix structure according to an embodiment of the present disclosure.

Referring to FIG. 1, a front view of a black matrix structure 01 according to an embodiment of the present disclosure is shown, and referring to FIG. 2, a cross-sectional view of a part A-A of the black matrix structure 01 shown in FIG. 1 is shown. With reference to FIG. 1 and FIG. 2, the black matrix structure 01 includes a plurality of crossed black matrix strips 011, and a side surface M of the black matrix strip 011 has a roughness less than 2 μm and is intersected with a reference plane (not shown in FIG. 1 and FIG. 2), the reference plane being parallel to a plane defined by crossing of the plurality of black matrix strips 011. In an exemplary embodiment, the roughness of the side surface M of the black matrix strip 011 is 1.8 μm, 1.5 μm, 1 μm, or the like.

In some embodiments, the black matrix structure 01 is a mesh structure composed of a plurality of crossed black matrix strips 011, and an area enclosed by the plurality of black matrix strips 011 is an opening area of the black matrix structure 01. The plurality of black matrix strips 011 may cross vertically and horizontally, and the lengthwise directions of the black matrix strips 011 that cross each other are perpendicular to each other. For example, as shown in FIG. 1, the plurality of black matrix strips 011 include black matrix strips 011 arranged along a first direction x and black matrix strips 011 arranged along a second direction y (in order to facilitate the distinguishing, the black matrix strips 011 arranged along the first direction x are marked as black matrix strips 011x, and the black matrix strips 011 arranged along the second direction y are marked as black matrix strips 011y; and the black matrix strips 011x and the black matrix strips 011y have the same structure, and their difference lies in that the black matrix strip 011x and the black matrix strip 011y are arranged in different directions). The first direction x is perpendicular to the second direction y, and an area enclosed by the black matrix strips 011x arranged along the first direction x and the black matrix strips 011y arranged along the second direction y is the opening area Q of the black matrix structure 01. As shown in FIG. 1 and FIG. 2, a width of the black matrix strip 011 is w, and a distance between two adjacent black matrix strips 011 of the plurality of black matrix strips 011 is d. A widthwise direction of the black matrix strips 011x arranged along the first direction x is parallel to the first direction x, and a lengthwise direction is parallel to the second direction y. A widthwise direction of the black matrix strips 011y arranged along the second direction y is parallel to the second direction y, and a lengthwise direction is parallel to the first direction x. The values of w and d may be determined according to the requirement of the display device in resolution. FIG. 1 and FIG. 2 are illustrated by taking an example where the width of the black matrix strip 011x is equal to the width of the black matrix strip 011y and the distance between two adjacent black matrix strips 011x is equal to the distance between two adjacent black matrix strips 011y. In some embodiments, the width of the black matrix strip 011x and the width of the black matrix strip 011y may not be equal, and the distance between two adjacent black matrix strips 011x and the distance between two adjacent black matrix strips 011y may not be equal, which is not limited in embodiments of the present disclosure.

Figure 3:
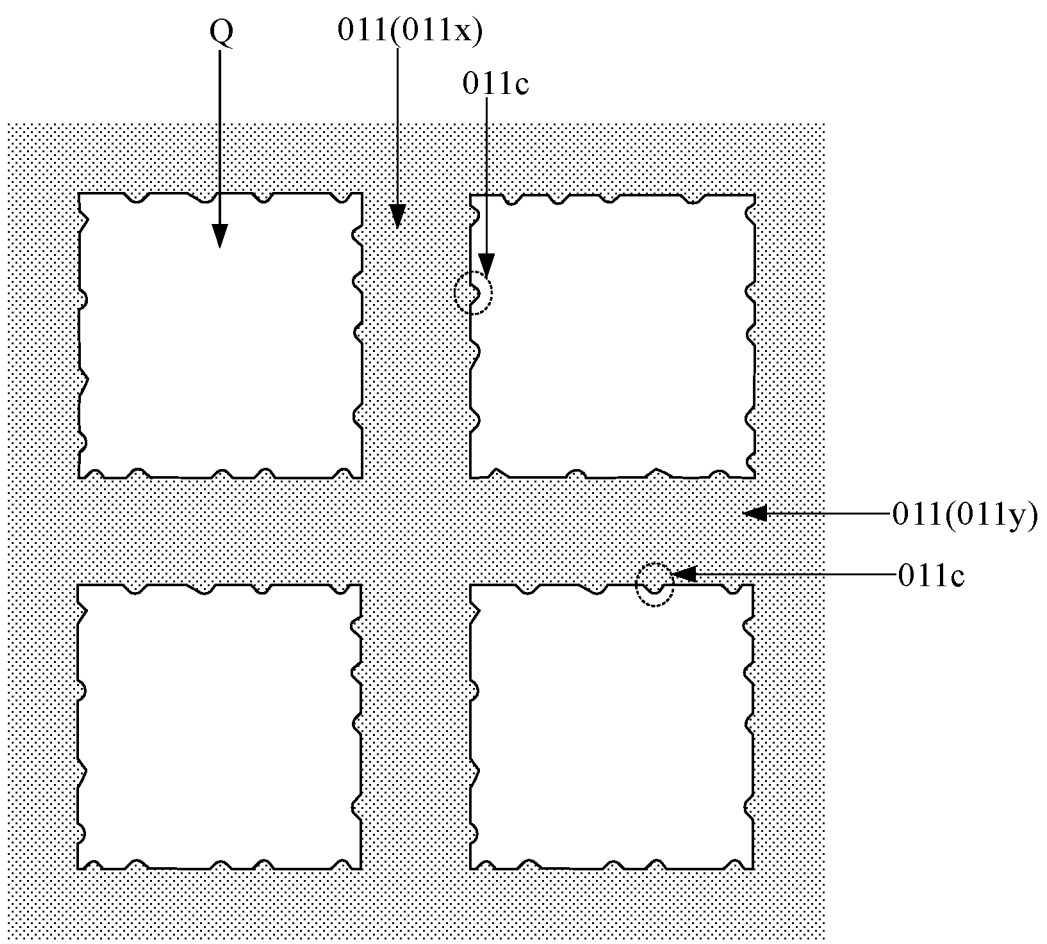
FIG. 3 is an enlarged perspective view of an area R in FIG. 1.
Figure 4:
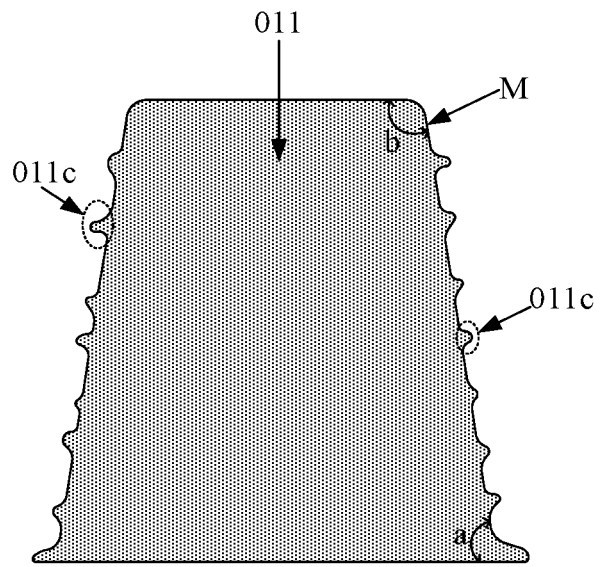
FIG. 4 is an enlarged view of any black matrix strip in FIG. 2.

Affected by the manufacturing process of the black matrix structure, the black matrix strip may have a burr structure on the side surface. The roughness of the side surface of the black matrix strip may be characterized by the height of the burr structure, or may refer to the height of the burr structure. In embodiments of the present disclosure, the burr structure on the side surface of the black matrix strip is processed during the process of manufacturing the black matrix structure to reduce the height of the burr structure, such that the roughness of the side surface of the black matrix strip is less than 2 μm, thereby satisfying the display devices having a high requirement in quality such as VR devices. In an exemplary embodiment, referring to FIG. 3, an enlarged view of the area R in FIG. 1, and referring to FIG. 4, an enlarged view of any black matrix strip 011 in FIG. 2 is shown. FIG. 3 and FIG. 4 may both be pictures taken by automatic optical inspection (AOI) equipment. As shown in FIG. 3 and FIG. 4, the black matrix strip 011 has a burr structure 011c on the side surface M, and the height of the burr structure 011c is less than 2 μm, which enables the roughness of the side surface M of the black matrix strip 011 to be less than 2 μm.

Figure 5:
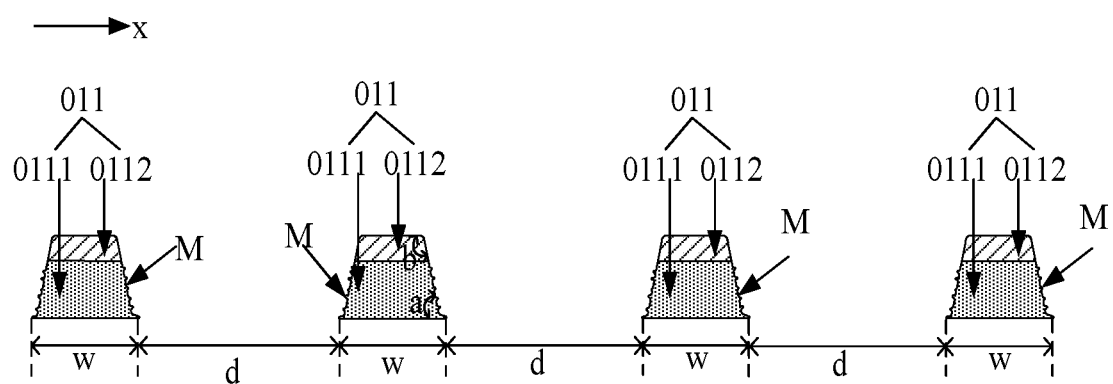
FIG. 5 is a cross-sectional view of another black matrix structure according to an embodiment of the present disclosure.
Figure 6:
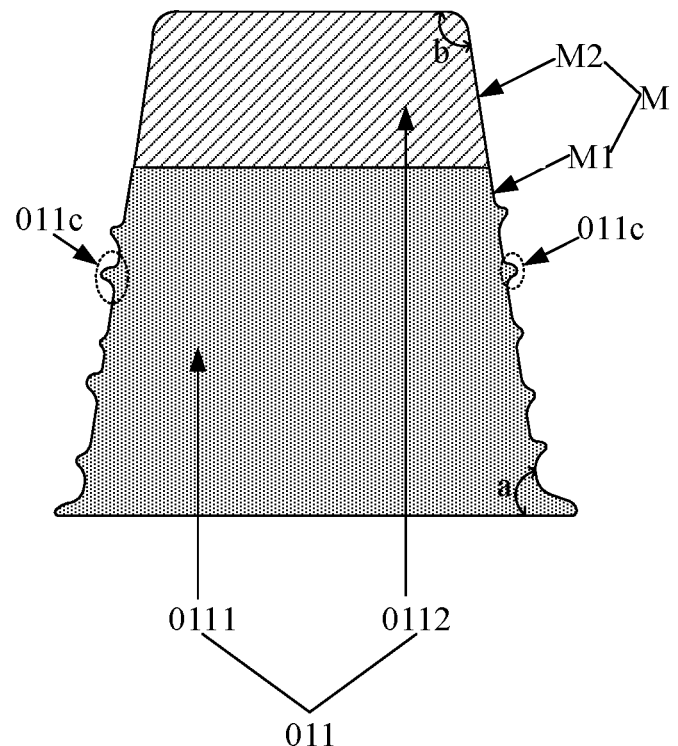
FIG. 6 is an enlarged view of any black matrix strip in FIG. 4.
Figure 7:
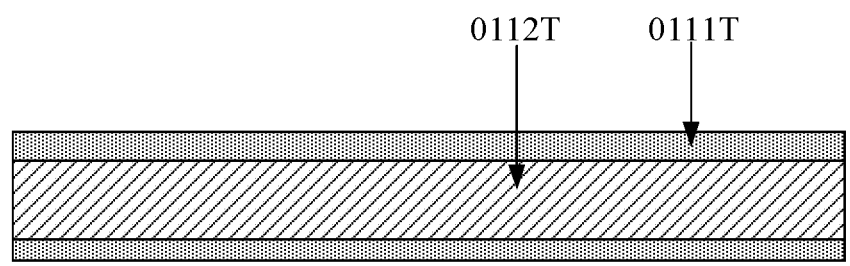
FIG. 7 is a projection relationship diagram of a light shielding strip and a protective dielectric strip according to an embodiment of the present disclosure.

In some embodiments, each black matrix strip 011 of the plurality of black matrix strips 011 has a laminated structure. In an exemplary embodiment, referring to FIG. 5, a cross-sectional view of another black matrix structure according to an embodiment of the present disclosure is shown, and may be a cross-sectional view of a part A-A of the black matrix structure 01 shown in FIG. 1; and referring to FIG. 6, an enlarged view of any black matrix strip in FIG. 4 is shown, and may be a picture taken by the AOI equipment. As shown in FIGS. 5 and 6, the black matrix strip 011 is a laminated structure formed by a light shielding strip 0111 and a protective dielectric strip 0112. For example, the black matrix strip 011 is a double-layer structure formed by the light shielding strip 0111 and the protective dielectric strip 0112. FIG. 7 is a projection relationship diagram of the light shielding strip 0111 and the protective dielectric strip 0112. As shown in FIG. 7, the orthographic projection 0112T of the protective dielectric strip 0112 on the reference plane (not shown in FIG. 7) is within the orthographic projection 0111T of the light shielding strip 0111 on the reference plane. The reference plane is parallel to a plane defined by the crossing of the plurality of black matrix strips 011. As shown in FIG. 6, when the black matrix strip 011 is a laminated structure formed by the light shielding strip 0111 and the protective dielectric strip 0112, the side surface M of the black matrix strip 011 is formed by connecting the side surface M1 of the light shielding strip 0111 and the side surface M2 of the protective dielectric strip 0112, and the burr structure 011c is disposed on the side surface M1 of the light shielding strip 0111. Optionally, the side surface M2 of the protective dielectric strip 0112 may also have a burr structure, which is not limited in the embodiments of the present disclosure. The material of the light shielding strip 0111 may be black photoresist, such as black positive photoresist or negative photoresist. The material of the protective dielectric strip 0112 may be one silicon oxide (SiOx), silicon nitride (SiNx), or silicon oxynitride (SiOxNx), or any combination thereof, which is not limited in the embodiments of the present disclosure.

In some embodiments, a slop angle α of each black matrix strip 011 in the plurality of black matrix strips 011 ranges from 70 degrees to 80 degrees. For example, the slop angle α of the black matrix strip 011 may be 72 degrees, 75 degrees, 78 degrees, or the like. A first cross section of the black matrix strip 011 is in a shape of a chamfered isosceles trapezoid. The ramp angle α of the black matrix strip 011 may be a bottom angle of the chamfered isosceles trapezoid, and the bottom angle of the chamfered isosceles trapezoid is an angle between a lower bottom of the chamfered isosceles trapezoid and a leg of the chamfered isosceles trapezoid. The first cross section of each black matrix strip 011 is parallel to the widthwise direction of the black matrix strip 011 and perpendicular to the lengthwise direction of the black matrix strip. For example, as shown in FIG. 1, the first cross section of the black matrix strip 011x is parallel to the first direction x and perpendicular to the second direction y, and the first cross section of the black matrix strip 011y is parallel to the second direction y and perpendicular to the first direction x. The ramp angle of the black matrix strip in the industry is small and has a maximum value of about 70 degrees, which may cause the black matrix strip to have a rather large width. In embodiments of the present disclosure, since the ramp angle of the black matrix strip 011 ranges from 70 degrees to 80 degrees, the ramp angle of the black matrix strip 011 is relatively small, which helps to reduce the width of the black matrix strip 011 and thereby improve the resolution of the display device. Optionally, a vertex angle b of the chamfered isosceles trapezoid is a circular arc chamfer, and refers to the angle between the upper base of the chamfered isosceles trapezoid and the leg of the chamfered isosceles trapezoid. The vertex angle b (that is, an arc-shaped chamfer) of the chamfered isosceles trapezoid ranges from 120 degrees to 130 degrees. For example, the vertex angle b of the chamfered isosceles trapezoid is 122 degrees, 125 degrees, 128 degrees, or the like. The vertex angle b of the chamfered isosceles trapezoid and the ramp angle α of the black matrix strip 011 may be complementary, and the sum thereof may be equal to 180 degrees, which is not limited in the embodiments of the present disclosure.

In summary, for the black matrix structure according to the embodiments of the present disclosure, the roughness of the side surface of the black matrix strip in the black matrix structure is less than 2 μm, such that the black matrix strip has a small roughness on the side surface, and thus the black matrix structure is suitable for the display devices having a high requirement in resolution.

Based on the same inventive concept, an embodiment of the present disclosure provides a display substrate, which includes the black matrix structure 01 according to the foregoing embodiments. For details about the structure of the black matrix structure 01, reference may be made to the foregoing embodiments and related descriptions in FIG. 1 to FIG. 7, which are not described any further in the embodiments of the present disclosure.

The embodiment of the present disclosure is illustrated by taking the black matrix structure 01 as an example of the black matrix structure shown in FIG. 5. In an exemplary embodiment, referring to FIG. 8, a schematic structural diagram of a display substrate according to an embodiment of the present disclosure is shown. The display substrate includes a base substrate 02 and a black matrix structure 01 on the base substrate 02. The black matrix strip 011 is a laminated structure formed by superimposing the light shielding strip 0111 and the protective dielectric strip 0112, and the orthographic projection of the protective dielectric strip 0112 on the base substrate 02 falls with the orthographic projection of the light shielding strip 0111 on the base substrate 02. The light shielding strip 0111 is disposed between the protective dielectric strip 0112 and the base substrate 02. That is, the light shielding strip 0111 and the protective dielectric strip 0112 are distributed in a direction distal from the base substrate 02.

In some embodiments, as shown in FIG. 8, the display substrate further includes a color filter layer 03. The color filter layer 03 is a color filter pattern composed of a plurality of filter structures arranged in an array, and each filter structure is disposed in an opening area Q of the black matrix structure 01. In an exemplary embodiment, the color filter layer 03 includes a red filter structure 031, a green filter structure 032, and a blue filter structure 033. The red filter structure 031 is configured to filter out the light other than the red light in the incident light and transmit the red light; the green filter structure 032 is configured to filter out the light other than the green light in the incident light and transmit the green light; and the blue filter structure 033 is configured to filter out the light other than the blue light in the incident light and transmit the blue light.

In some embodiments, as shown in FIG. 8, the display substrate further includes a protective layer 04 on the side surface of the color filter layer 03 distal from the base substrate 02. The protective layer 04 is configured to protect the color filter layer 03 and the black matrix structure 01, and the protective layer 04 may also be referred to as an over cover (OC) layer.

The structure of the display substrate shown in FIG. 8 is only exemplary. In practical applications, the display substrate may include more or less structures than that of FIG. 8. For example, the display substrate is a color filter substrate, and the display substrate further includes a spacer layer, an alignment layer, a common electrode, and other structures. For another example, the display substrate may not include the protective layer 04, which is not limited in the embodiments of the present disclosure.

In summary, for the display substrate according to the embodiments of the present disclosure, since the roughness of the side surface of the black matrix strip in the black matrix structure of the display substrate is less than 2 μm, the black matrix strip has a small roughness on the side surface, such that the display substrate is suitable for the display devices having a high requirement in resolution such as VR devices.

Based on the same inventive concept, the embodiments of the present disclosure provide a display device, and the display device includes the forgoing display substrate. In an exemplary embodiment, the display device may be a product or component having a display function, such as, a liquid crystal display panel, a piece of electronic paper, a mobile phone, a tablet computer, a TV set, a display, a notebook computer, a digital photo frame, a navigator, a VR device, an augmented reality (AR) device, a wearable device, or the like.

The black matrix structure and the display substrate according to the embodiments of the present disclosure are applicable to the following methods. For the methods for manufacturing the black matrix structure and the display substrate in the embodiments of the present disclosure and the manufacturing principles thereof, reference may be made to descriptions in the following embodiments.

Referring to FIG. 9, is a flowchart of a method for manufacturing a black matrix structure according to an embodiment of the present disclosure is shown. The method for manufacturing the black matrix structure is applicable to manufacturing of the black matrix structure 01 shown in FIG. 1, FIG. 2, and FIG. 5. Referring to FIG. 9, the method may include following steps.

In step 901, an initial black matrix structure is formed on the base substrate. The initial black matrix structure includes a plurality of crossed initial black matrix strips, and the initial black matrix strip includes a black matrix body and a burr structure protruding from a side of the black matrix body in a direction distal from the black matrix body.

In step 902, at least part of the burr structures of the initial black matrix strips in the initial black matrix structure are removed to acquire the black matrix structure.

The black matrix structure includes a plurality of crossed black matrix strips, and a side surface of the black matrix strip has a roughness less than 2 μm. For details about the black matrix structure, reference may be made to FIG. 1, FIG. 2, and FIG. 5.

In summary, for the method for manufacturing the black matrix structure according to the embodiments of the present disclosure, the initial black matrix structure is firstly formed on the base substrate, and then at least part of the burr structures of the initial black matrix strips in the initial black matrix structure are removed to acquire the black matrix structure. Since at least part of the burr structures of the initial black matrix strips are removed, the height of the burr structure of the black matrix strip in the black matrix structure is relatively low, such that the roughness of the side surface of the black matrix strip is small, and the black matrix strip is suitable for the display devices having a high requirement in resolution.

In some embodiments, the forgoing step 902 includes: forming a protective dielectric layer on a side of the initial black matrix structure distal from the base substrate; and etching the burr structures of the plurality of initial black matrix strips by a mask manufactured on a side of the protective dielectric layer distal from the initial black matrix structure, thereby removing at least part of the burr structures to acquire a plurality of light shielding strips.

In some embodiments, at least one first opening is defined by crossing of the plurality of initial black matrix strips, and the mask includes at least one second opening. The at least one second opening one-to-one corresponds to the first opening and the second opening has a size greater than the first opening, and a distance between a boundary of each second opening and a boundary of a corresponding first opening ranges from 0.5 μm to 2 μm.

In some embodiments, the burr structures of the plurality of initial black matrix strips are etched by a dry etching process.

In some embodiments, the burr structures of the plurality of initial black matrix strips are etched by taking a mixed gas of sulfur fluoride gas and oxygen gas as an etching gas.

In some embodiments, etching the burr structures of the plurality of initial black matrix strips by the mask manufactured on the side of the protective dielectric layer distal from the initial black matrix structure includes: forming a photoresist pattern on the side of the protective dielectric layer distal from the initial black matrix structure, the photoresist pattern including a plurality of crossed photoresist strips; over-etching the protective dielectric layer and the initial black matrix structure by taking the photoresist pattern as the mask, such that at least part of the burr structures of the plurality of initial black matrix strips are removed to acquire the plurality of light shielding strips; and removing the photoresist pattern.

In some embodiments, forming the protective dielectric layer on the side of the initial black matrix structure distal from the base substrate includes: forming the protective dielectric layer by an evaporation process on the side of the initial black matrix structure distal from the base substrate at a preset evaporation temperature, the preset evaporation temperature ranging from 210° C. to 230° C.

All the aforesaid optional technical solutions may be combined arbitrarily to form optional embodiments of the present disclosure, which are not described herein any further.

Figure 10:
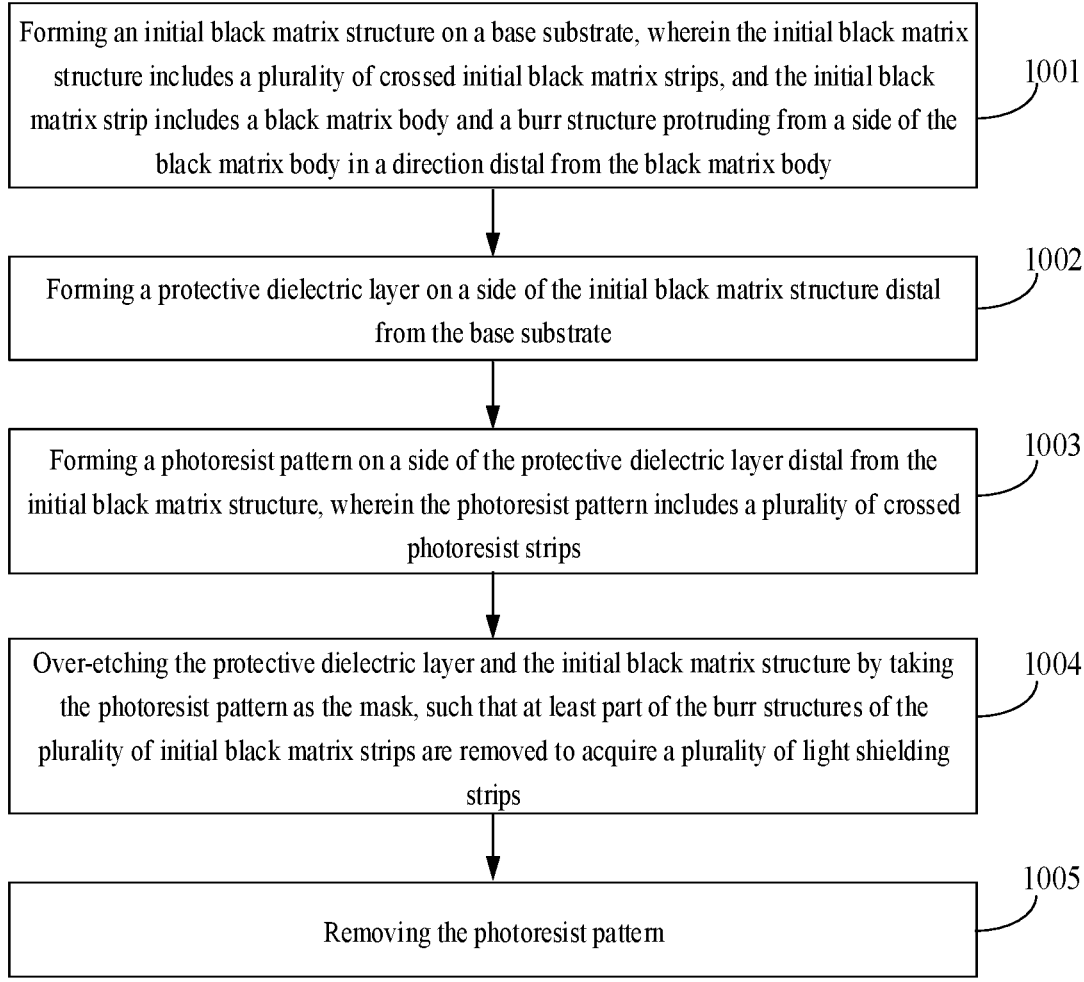
FIG. 10 is a flowchart of another method for manufacturing a black matrix structure according to an embodiment of the present disclosure.

Referring to FIG. 10, a flowchart of another method for manufacturing a black matrix structure according to an embodiment of the present disclosure is shown. The method for manufacturing the black matrix structure is applicable to manufacturing of the black matrix structure 01 shown in FIG. 1, FIG. 2, and FIG. 5. FIG. 10 is illustrated by taking the manufacturing of the black matrix structure 01 shown in FIG. 5 as an example. Referring to FIG. 10, the method may include following steps.

In step 1001, an initial black matrix structure is formed on the base substrate. The initial black matrix structure includes a plurality of crossed initial black matrix strips, and the initial black matrix strip includes a black matrix body and a burr structure protruding from a side of the black matrix body in a direction distal from the black matrix body.

Figure 11:
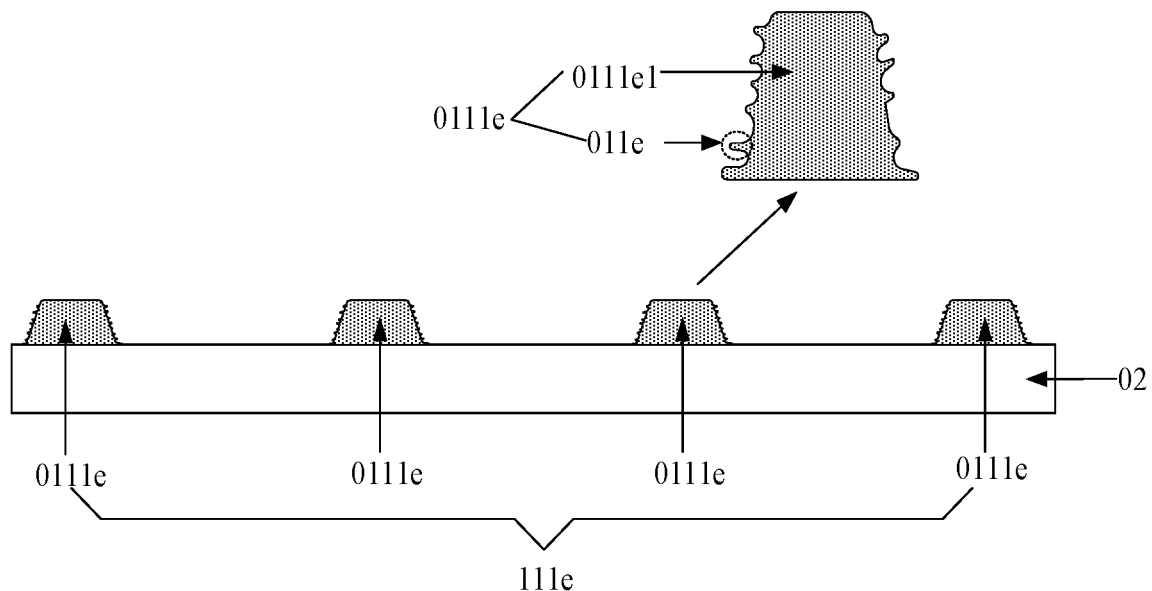
FIG. 11 is a schematic diagram of an example where an initial black matrix is formed on a base substrate according to an embodiment of the present disclosure.

In an exemplary embodiment, referring to FIG. 11, is a schematic diagram of an example where the initial black matrix structure 111e is formed on the base substrate 02 according to an embodiment of the present disclosure is shown. The initial black matrix structure 111e includes a plurality of crossed initial black matrix strips 0111e (the front view of the initial black matrix structure 111e is similar to FIG. 1). Each initial black matrix strip 0111e of the plurality of initial black matrix strips 0111e includes a black matrix body 0111e1 and a burr structure 011e protruding from the side surface of the black matrix body 0111e1 in a direction distal from the black matrix body 0111e1. The black matrix body 0111e1 and the burr structure 011e are an integral structure. The side surface of the black matrix body 0111e1 is intersected with the panel surface of the base substrate 02. For example, the burr structure 011e extends distal from the black matrix body 0111e1 in a direction parallel to the base substrate 02.

In some embodiments, the material of the initial black matrix structure is black photoresist, such as black positive photoresist or negative photoresist, which is not limited in the embodiments of the present disclosure. Forming the initial black matrix structure on the base substrate may include: coating a layer of black photoresist material on the base substrate as a black matrix film firstly; baking the black matrix film to attach the black matrix film to the base substrate; and then, exposing, developing and curing the black matrix film sequentially to acquire the initial black matrix structure. In an exemplary embodiment, the initial black matrix structure may be acquired by curing the developed black matrix film for about 30 minutes at a temperature of about 230° C. The developing solution has the same developing rate for the black matrix film in all directions. Thus, in the initial black matrix structure acquired after the development, the side surface of the initial black matrix strip is developed into grooves, which causes the initial black matrix strip to have a burr structure on the side surface and thereby forms an initial black matrix structure 111e having a shape as shown in FIG. 11.

After the initial black matrix structure is formed on the base substrate, a protective dielectric layer may be formed on a side of the initial black matrix structure distal from the base substrate. Then, the burr structures of the plurality of initial black matrix strips is etched by a mask manufactured on the side of the protective dielectric layer distal from the initial black matrix structure, thereby removing at least part of the burrs structure to acquire a plurality of light shielding strips. Optionally, at least one first opening is defined by crossing of the plurality of initial black matrix strips, and the mask includes at least one second opening. The at least one second opening one-to-one corresponds to the at least one first opening and the second opening has a size greater than the first opening, and a distance between a boundary of each second opening and a boundary of a corresponding first opening ranges from 0.5 μm to 2 μm. The process will be introduced though the following steps 1002 to 1005.

In step 1002, a protective dielectric layer is formed on a side of the initial black matrix structure distal from the base substrate.

Figure 12:
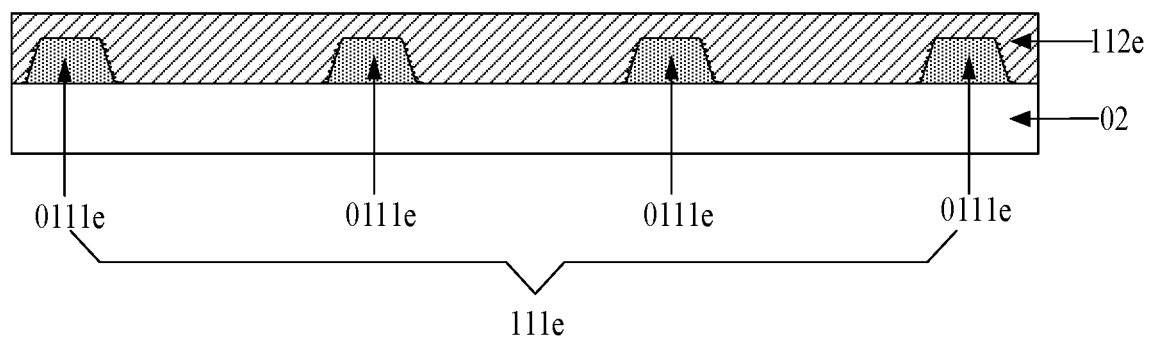
FIG. 12 is a schematic diagram of an example where a protective dielectric layer is formed on a side of an initial black matrix structure distal from the base substrate according to an embodiment of the present disclosure.

In an exemplary embodiment, referring to FIG. 12, a schematic diagram of an example where the protective dielectric layer 112e is formed on a side of the initial black matrix structure 111e distal from the base substrate 02 according to an embodiment of the present disclosure is shown. The protective dielectric layer 112e covers the initial black matrix structure 111e, and the protective dielectric layer 112e may be a light transmitting film layer.

In some embodiments, the protective dielectric layer is formed on the side of the initial black matrix structure distal from the base substrate by an evaporation process at a preset evaporation temperature. The preset vapor deposition temperature herein ranges from 210° C. to 230° C. For example, the preset vapor deposition temperature may be 215° C., 220° C., 225° C., or the like. The material of the protective dielectric layer 0112 may be one of SiOx, SiNx, or SiOxNx, or any combination thereof, which is not limited in the embodiments of the present disclosure. In an exemplary embodiment, the embodiment of the present disclosure is illustrated by taking an example where the material of the protective dielectric layer is SiOx. Thus, forming the protective dielectric layer on the side of the initial black matrix structure distal from the base substrate includes forming an evaporated layer of SiOx as a protective dielectric layer on the side of the initial black matrix structure distal from the base substrate by the evaporation process at an evaporation temperature of 210° C. to 230° C.

In step 1003, a photoresist pattern is formed on the side of the protective dielectric layer distal from the initial black matrix structure. The photoresist pattern includes a plurality of crossed photoresist strips.

Figure 13:
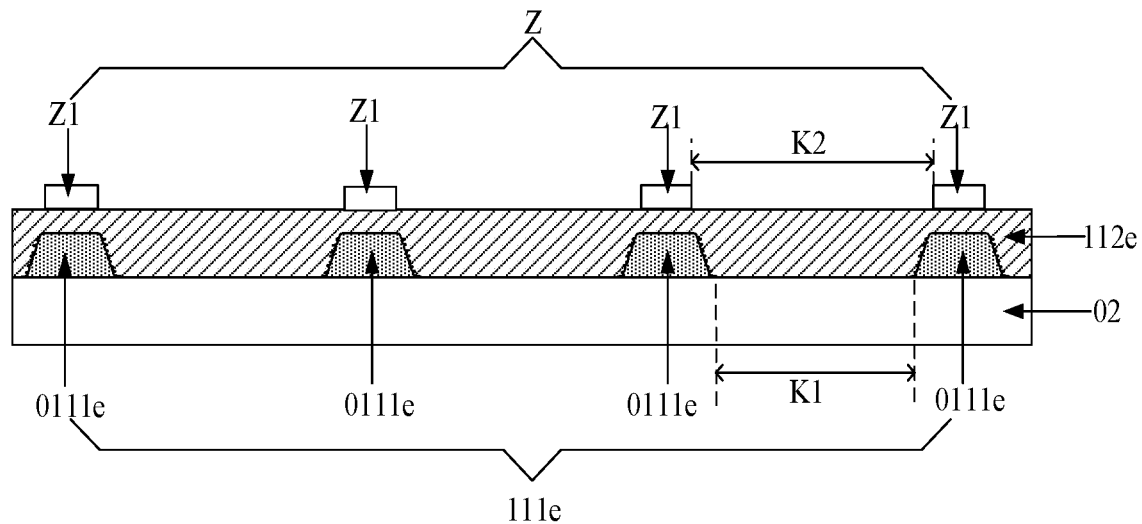
FIG. 13 is a schematic diagram of an example where a photoresist pattern is formed on a side of the protective dielectric layer distal from the base substrate according to an embodiment of the present disclosure.

In an exemplary embodiment, referring to FIG. 13, a schematic diagram of an example where a photoresist pattern Z is formed on a side of the protective dielectric layer 112e distal from the initial black matrix structure 111e according to an embodiment of the present disclosure is shown. The photoresist pattern Z includes a plurality of photoresist strips Z1 (the front view of the photoresist pattern Z is similar to FIG. 1). The orthographic projection of the plurality of photoresist strips Z1 on the base substrate 02 covers the orthographic projection of at least part of the black matrix body 0111e1 of the plurality of initial black matrix strips 0111e of the initial black matrix structure 111e on the base substrate 02 and does not cover the orthographic projection of at least part of the burr structures 011e of the plurality of initial black matrix strips 0111e on the base substrate 02. Optionally, the plurality of photoresist strips Z1 one-to-one correspond to the plurality of initial black matrix strips 011ie. The crossing of the plurality of initial black matrix strips 0111e defines at least one first opening K1, and the crossing of the plurality of photoresist strips Z1 defines at least one second opening K2. The at least one second opening K2 one-to-one corresponds to the at least one first opening K1, and the size of the second opening K2 is greater than the size of the first opening K1. In addition, the distance between the boundary of each second opening K2 and the boundary of the corresponding first opening K1 ranges from 0.5 μm to 2 μm, such that the orthographic projection of each photoresist strip Z1 on the base substrate 02 covers the orthographic projection of at least part of the black matrix body 0111e1 of the corresponding initial black matrix strip 0111e on the base substrate 02 and does not cover the orthographic projection of at least part of the burr structure 011e of the initial black matrix strip 0111e on the base substrate 02. In an exemplary embodiment, the distance between the boundary of each second opening K2 and the boundary of the corresponding first opening K1 is 0.5 µm, 1 µm, 1.5 µm, 2 µm, or the like. The details may be determined according to processing requirements, which are not limited in the embodiments of the present disclosure.

The material of the photoresist pattern herein may be positive photoresist or negative photoresist. For example, a layer of photoresist may be coated on the side of the protective dielectric layer distal from the base substrate and then cured to acquire the photoresist film. Afterwards, a mask with a corresponding pattern is adopted to expose the photoresist film, and the exposed photoresist film is developed to acquire the photoresist pattern.

In step 1004, the protective dielectric layer and the initial black matrix structure are over-etched by taking the photoresist pattern as the mask, such that at least part of the burr structures of the plurality of initial black matrix strips are removed to acquire the plurality of light shielding strips.

Over-etching the protective dielectric layer and the initial black matrix structure by taking the photoresist pattern as the mask not only can remove at least part of the burr structures of the plurality of initial black matrix strips and acquire a plurality of light shielding strips, but also can acquire a protective structure that includes a plurality of crossed protective dielectric strips. The plurality of protective dielectric strips and the plurality of light shielding strips are superimposed to form a plurality of black matrix strips, and the plurality of black matrix strips are crossed to form a black matrix structure. The protective structure is acquired by etching the protective dielectric layer.

In some embodiments, the protective dielectric layer and the initial black matrix structure is over-etched by a dry etching process by taking the photoresist pattern as the mask. In the process of over-etching the protective dielectric layer and the initial black matrix structure, the protective dielectric layer may be etched to acquire the protective structure, and at least part of the burr structure of the initial black matrix strip may be etched to etch away at least part of the burr structure of the initial black matrix strip, such that a plurality of light shielding strips are acquired by removing the at least part of the burr structure of the initial black matrix strip. In an exemplary embodiment, the protective dielectric layer and the initial black matrix structure are over-etched by taking the photoresist pattern as the mask and taking the mixed gas of sulfur fluoride (SF$_6$) gas and oxygen (O$_2$) as the etching gas.

Figure 14:
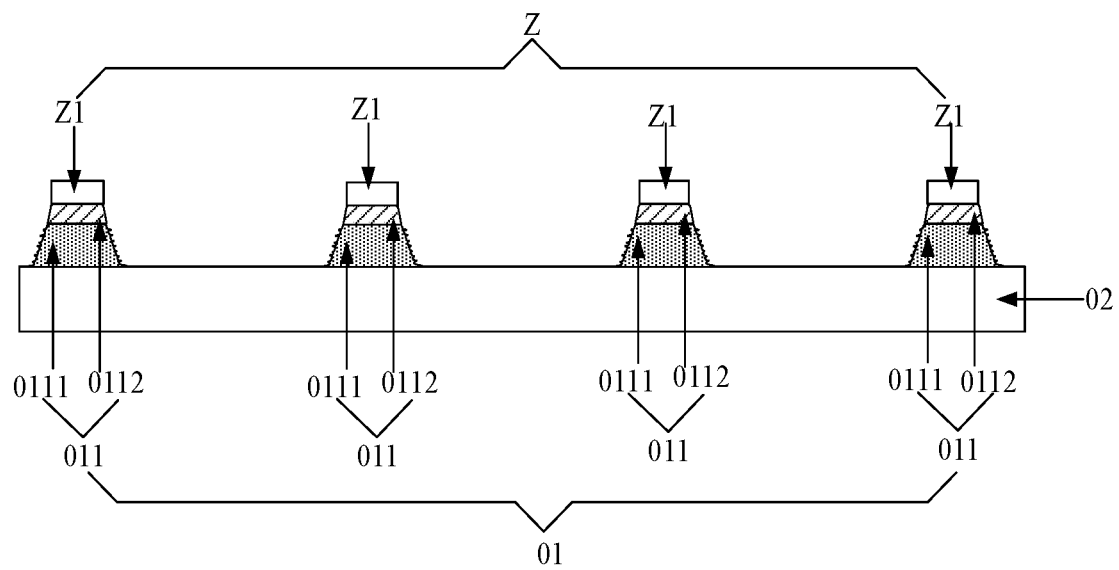
FIG. 14 is a schematic diagram of an example where a protective dielectric layer and an initial black matrix structure are over-etched by taking a photoresist pattern as a mask according to an embodiment of the present disclosure.

In an exemplary embodiment, FIG. 14 is a schematic diagram of an example where the protective dielectric layer 112e and the initial black matrix structure 0111e are over-etched by taking the photoresist pattern Z as the mask according to an embodiment of the present disclosure. Upon over-etching of the protective dielectric layer 112e and the initial black matrix structure 0111e, a part of the protective dielectric layer 112e corresponding to the opening area of the photoresist pattern Z (such as the area where the second opening K2 is disposed) is etched away, and the part corresponding to the photoresist strip Z1 is remained to acquire the protective structure (the protective structure is not shown in FIG. 14, and the front view of the protective structure is similar to FIG. 1). The protective structure includes a plurality of crossed protective dielectric strips 0112. During the process of over-etching the protective dielectric layer 112e and the initial black matrix structure 0111e, the parts of the burr structures 011e of the plurality of initial black matrix strips 0111e, which are not covered by the photoresist strip Z1, are also etched away, such that at least part of the burr structures 011e are removed to acquire a burr structure 011c and thereby acquire the plurality of light shielding strips 0111. The plurality of protective dielectric strips 0112 and the plurality of light shielding strips 0111 are superimposed to form a plurality of black matrix strips 011, and the plurality of black matrix strips 0111 are crossed to form the black matrix structure 01. In the black matrix structure 01, the roughness of the side surface of the black matrix strip 0111 is less than 2 µm, and the side surface of the black matrix strip 0111 is relatively flat and smooth. Optionally, the plurality of protective dielectric strips 0112 one-to-one correspond to a plurality of light shielding strips 0111, and each protective dielectric strip 0112 and a corresponding light shielding strip 0111 are superimposed to form the black matrix strip 011. The shape of each black matrix strip 011 may be as shown in FIG. 6, and the orthographic projection of each protective dielectric strip 0112 on the base substrate 02 is within the orthographic projection of the corresponding light shielding strip 0111 on the base substrate 02.

Compared with the development process, the dry etching process is anisotropic and the etching direction is easy to control. In the embodiments of the present disclosure, the protective dielectric layer and the initial black matrix structure may be over-etched in a direction perpendicular to the base substrate by the dry etching process. In this way, in the black matrix structure acquired by step 1004, the ramp angle of the black matrix strip may be up to 70 degrees to 80 degrees, and the side surface of the black matrix strip is almost perpendicular to the base substrate, the resolution of the display devices is improved.

In step 1005, the photoresist pattern is removed.

Figure 15:
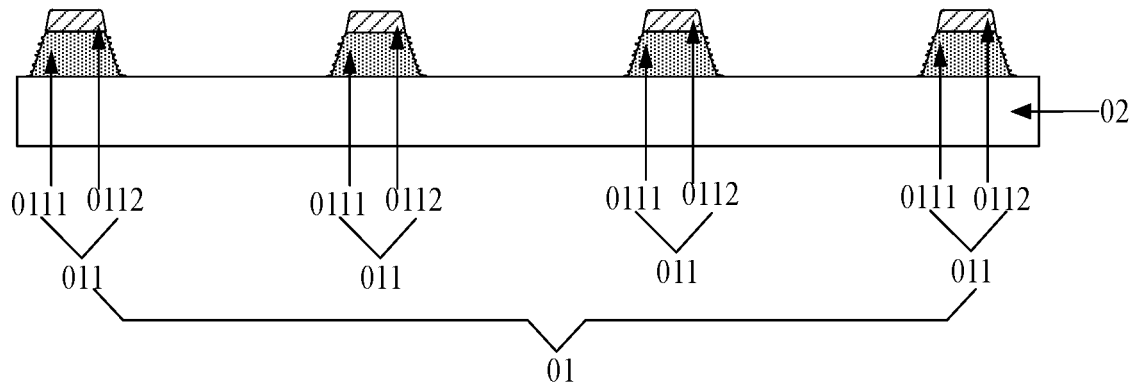
FIG. 15 is a schematic diagram of an example where a photoresist pattern is removed according to an embodiment of the present disclosure.

In an exemplary embodiment, referring to FIG. 15, a schematic diagram of an example where the photoresist pattern Z is removed according to an embodiment of the present disclosure is shown. The photoresist pattern Z may be removed by a photoresist stripping process, an ashing process or the like.

Steps 1002 to 1005 are a practice of step 902 in the above embodiments, and step 902 may also be performed in other ways. For example, the protective structure (the protective structure as shown in FIG. 14) is firstly formed on the side of the initial black matrix structure 111e distal from the base substrate 02, such that the protective structure includes a plurality of crossed protective dielectric strips 0112. The orthographic projection of the plurality of protective dielectric strips 0112 on the base substrate 02 covers the orthographic projection of at least part of the black matrix body 0111e1 of the plurality of initial black matrix strips 0111e of the initial black matrix structure 111e on the base substrate 02 and does not cover the orthographic projection of at least part of the burr structures 011e of the plurality of initial black matrix strips 0111e on the base substrate 02. Then, the burr structure 011e of the plurality of initial black matrix strips 0111e is etched by taking the protective structure as the mask, such that at least part of the burr structures 011e are removed to acquire a plurality of light shielding strips 0111. The plurality of protective dielectric strips 0111 and the plurality of light shielding strips 0112 are superimposed to form the plurality of black matrix strips 011, and the plurality of black matrix strips 011 are crossed to form the black matrix structure 01.

Forming the protective structure on the side of the initial black matrix structure 111e distal from the base substrate 02 may include: forming the protective dielectric layer firstly on the side of the initial black matrix structure 111e distal from the base substrate 02 (referring to step 1002 for the implementation process); then, forming the photoresist pattern on the side of the protective dielectric layer distal from the base substrate (referring to step 1003 for the implementation process); and afterwards, etching the protective dielectric layer by taking the photoresist pattern as the mask (referring to step 1004 for the implementation process, and the difference lies in that the protective dielectric layer and the initial black matrix structure are over-etched in step 1003 and the protective dielectric layer is etched and protected here) to acquire the protective structure. Etching the burr structures of the plurality of initial black matrix strips by taking the protective structure as the mask may include etching the burr structures of the plurality of initial black matrix strips by the dry etching process by taking the protective structure as the mask. For example, the burr structures of the plurality of initial black matrix strips are etched by taking the mixed gas of $SF_6$ and $O_2$ as the etching gas.

The sequence of steps of the method for manufacturing the black matrix structure according to the embodiment of the present disclosure may be appropriately adjusted, and the steps may also be correspondingly added or deleted according to the situation. Any method that can be easily conceived by any one skilled in the art within the technical scope disclosed in the present disclosure shall be contained within the protection scope of the present disclosure, and therefore will not be described again.

In summary, for the method for manufacturing the black matrix structure according to the embodiments of the present disclosure, the initial black matrix structure is first formed on the base substrate, and then at least part of the burr structures of the initial black matrix strips in the initial black matrix structure are removed to thereby acquire the black matrix structure. Since at least part of the burr structures of the initial black matrix strips are removed, the height of the burr structure of the black matrix strip in the black matrix structure is relatively low, such that the roughness of the side surface of the black matrix strip is small and the black matrix strip is suitable for the display devices having a high requirement in resolution.

Figure 16:
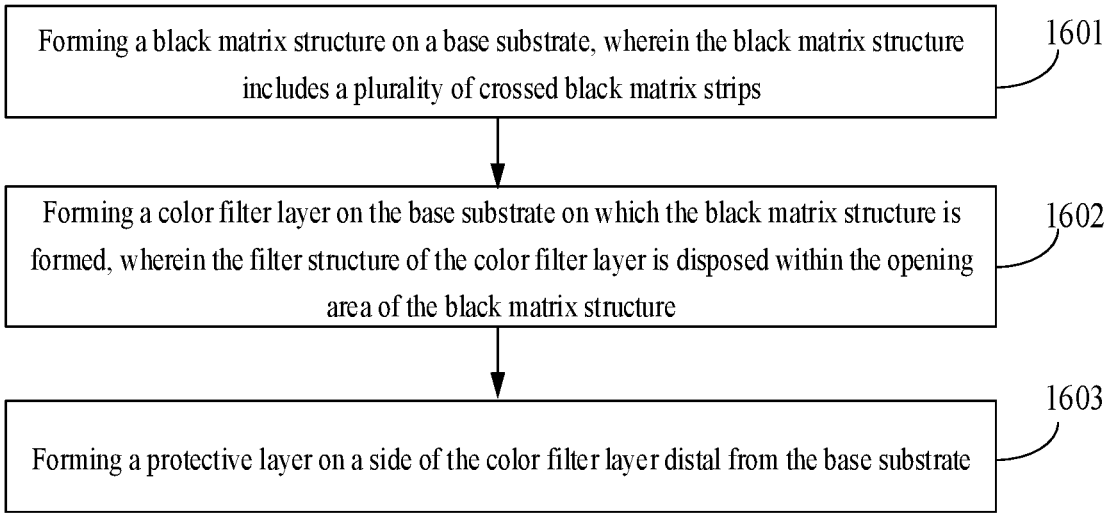
FIG. 16 is a flowchart of a method for manufacturing a display substrate according to an embodiment of the present disclosure.

Referring to FIG. 16, a flowchart of a method for manufacturing a display substrate according to an embodiment of the present disclosure is shown. The method for manufacturing the display substrate is applicable to manufacturing of the display substrate shown in FIG. 8. Referring to FIG. 16, the method may include following steps.

In step 1601, a black matrix structure is formed on a base substrate. The black matrix structure includes a plurality of crossed black matrix strips.

For the process of forming the black matrix structure on the base substrate, reference may be made to the embodiments shown in FIG. 9 and FIG. 10. The schematic diagram after forming the black matrix structure on the base substrate is as shown in FIG. 15, which is not described any further herein.

In step 1602, a color filter layer is formed on the base substrate on which the black matrix structure is formed. The filter structure of the color filter layer is disposed within the opening area of the black matrix structure.

Figure 17:
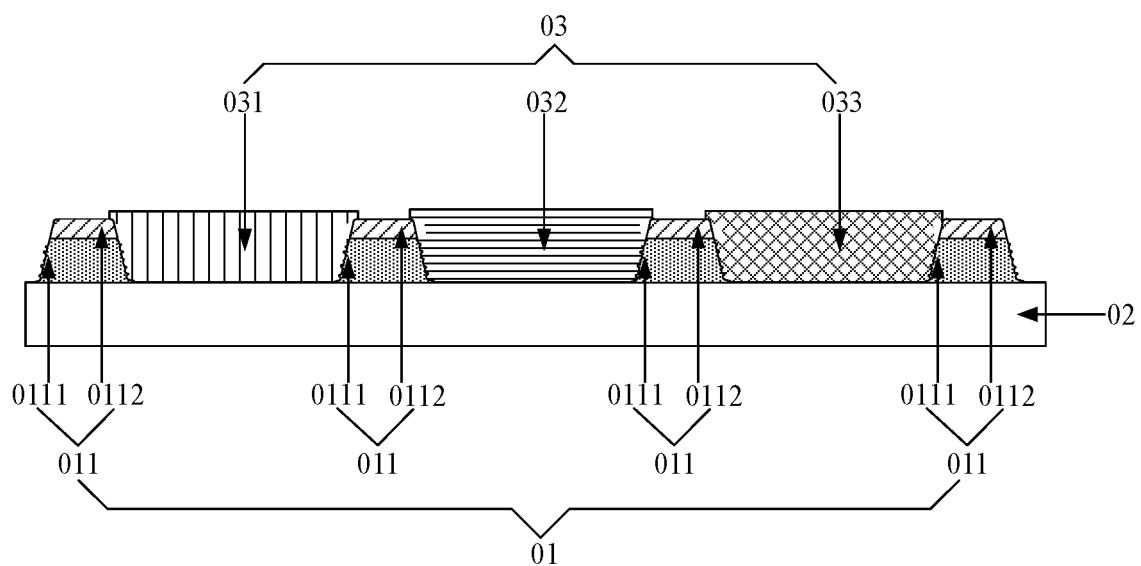
FIG. 17 is a schematic diagram of an example where a color filter layer is formed on a base substrate on which a black matrix structure is formed according to an embodiment of the present disclosure.

Referring to FIG. 17, a schematic diagram after forming the color filter layer 03 on the base substrate 02 on which the black matrix structure 01 is formed according to an embodiment of the present disclosure is shown. The color filter layer 03 includes a red filter structure 031, a green filter structure 032, and a blue filter structure 033. The red filter structure 031, the green filter structure 032, and the blue filter structure 033 are located in different opening areas of the black matrix structure 01. Optionally, the material of the red filter structure 031 is a red resin material, the material of the green filter structure 032 is a green resin material, and the material of the blue filter structure 033 is a blue resin material. In an exemplary embodiment, forming the color filter layer 03 on the base substrate 02 on which the black matrix structure 01 is formed includes: coating a layer of red resin material firstly on the base substrate 02 on which the black matrix structure 01 is formed to acquire a red resin material layer, and processing the red resin material layer by a one-time patterning process to acquire a red filter structure 031; then, coating a layer of green resin material on the base substrate 02 on which the red filter structure 031 is formed to acquire a green resin material layer, and processing the green resin material layer by the one-time patterning process to acquire the green filter structure 032; and finally, coating a layer of blue resin material on the base substrate 02 on which the green filter structure 032 is formed to acquire a blue resin material layer, and processing the blue resin material layer by the one-time patterning process to acquire the blue filter structure 033, such that the color filter layer 03 is acquired so far.

The one-time patterning process herein includes photoresist coating, exposing, developing, etching, and photoresist stripping. Thus, processing the material layer (such as the red resin material layer) by the one-time patterning process includes: coating a layer of photoresist firstly on the material layer (such as the red resin material layer); then, exposing the photoresist by the mask, such that the photoresist forms a fully exposed area and a non-exposed area; afterwards, implementing the developing process to remove the photoresist in the fully exposed area and remain the photoresist in the non-exposed area; then, etching the corresponding area of the fully exposed area on the material layer (such as the red resin material layer); and finally, stripping the photoresist in the non-exposed area to acquire the corresponding structure (such as the red filter structure 031). The positive photoresist is taken as an example to describe the one-time patterning process. The photoresist adopted in the one-time patterning process may also be a negative photoresist, which is not described any further in the embodiments of the present disclosure. In addition, the embodiment of the present disclosure is illustrated by taking an example where the red filter structure 031 is formed firstly, the green filter structure 032 is then formed, and the blue filter structure 033 is formed finally. The sequence of manufacturing the red filter structure 031, the green filter structure 032, and the blue filter structure 033 may be adjusted, and the embodiment of the present disclosure does not limit the sequence of manufacturing the red filter structure 031, the green filter structure 032, and the blue filter structure 033.

In step 1603, a protective layer is formed on a side of the color filter layer distal from the base substrate.

In an exemplary embodiment, for the schematic diagram after forming the protective layer 04 on the side of the color filter layer 03 distal from the base substrate 02, reference may be made to FIG. 8. As shown in FIG. 8, the protective layer 04 covers the color filter layer 03 and the black matrix structure 01. Optionally, the material of the protective layer 04 is a resin material. For example, a layer of resin material may be coated as the protective layer 04 on the side of the color filter layer 03 distal from the base substrate 02.

The method for manufacturing the display substrate according to an embodiment shown in FIG. 16 is only exemplary. The method for manufacturing the display substrate may further include other steps depending on the display substrate. For example, when the display substrate is a color filter substrate, it may further include steps of forming a spacer layer, an alignment layer, a common electrode, and the like. Furthermore, the sequence of steps of the method for manufacturing the display substrate according to the embodiment of the present disclosure may be appropriately adjusted, and the steps may also be correspondingly added or deleted according to the situation. Any method that can be easily conceived by any one skilled in the art within the technical scope disclosed in the present disclosure shall be contained within the protection scope of the present disclosure, which is not described herein any further.

In summary, for the method for manufacturing the array substrate according to the embodiment of the present disclosure, since the width of the black matrix strip in the display substrate manufactured by the method is small and the distance between two adjacent black matrix strips is small, the display substrate is suitable for the display devices having a high requirement in the resolution such as VR devices.

It can be understood by a person skilled in the art that all or parts of the steps of the method may be accomplished by hardware or program instructing related hardware. The program is stored in a computer readable storage medium, and the computer readable storage medium may be a read only memory, a disk, an optical disk, or the like.

Described above are merely exemplary embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A method for manufacturing a black matrix structure, comprising:
   forming an initial black matrix structure on a base substrate, wherein the initial black matrix structure comprises a plurality of crossed initial black matrix strips, and each of the plurality of initial black matrix strips comprises a black matrix body and a burr structure protruding from a side surface of the black matrix body in a direction distal from the black matrix body; and
   removing at least part of the burr structure of each of the plurality of initial black matrix strips in the initial black matrix structure to acquire the black matrix structure, wherein the black matrix structure comprises a plurality of crossed black matrix strips, and a side surface of the black matrix strip has a roughness less than 2 μm and is intersected with a panel surface of the base substrate;
   wherein removing at least part of the burr structure of each of the plurality of initial black matrix strip in the initial black matrix structure to acquire the black matrix structure comprises:
   forming a protective dielectric layer on a side of the plurality of initial black matrix structure distal from the base substrate; and
   etching the burr structures of the plurality of initial black matrix strips by a mask manufactured on a side of the protective dielectric layer distal from the initial black matrix structure, thereby removing at least part of the burr structures to acquire a plurality of light shielding strips.

2. The method according to claim 1, wherein at least one first opening is defined by crossing of the plurality of initial black matrix strips, and the mask comprises at least one second opening, wherein the at least one second opening one-to-one corresponds to the at least one first opening, and the second opening has a size greater than the first opening, and a distance between a boundary of each second opening and a boundary of a corresponding first opening ranges from 0.5 μm to 2 μm.

3. The method according to claim 1, wherein
the burr structures of the plurality of initial black matrix strips are etched by a dry etching process.

4. The method according to claim 3, wherein
the burr structures of the plurality of initial black matrix strips are etched by taking a mixed gas of sulfur fluoride gas and oxygen gas as an etching gas.

5. The method according to claim 1, wherein
etching the burr structures of the plurality of initial black matrix strips by the mask manufactured on the side of the protective dielectric layer distal from the initial black matrix structure comprises:
   forming a photoresist pattern on the side of the protective dielectric layer distal from the initial black matrix structure, the photoresist pattern comprising a plurality of crossed photoresist strips;
   over-etching the protective dielectric layer and the initial black matrix structure by taking the photoresist pattern as the mask, thereby removing at least part of the burr structures of the plurality of initial black matrix strips to acquire the plurality of light shielding strips; and
   removing the photoresist pattern.

6. The method according to claim 1, wherein
forming the protective dielectric layer on the side of the initial black matrix structure distal from the base substrate comprises:
   forming the protective dielectric layer by an evaporation process on the side of the initial black matrix structure distal from the base substrate at a preset evaporation temperature, the preset evaporation temperature ranging from 210° C. to 230° C.

7. A black matrix structure, which is manufactured by using the method according to claim 1.

8. The black matrix structure according to claim 7, wherein
a material of the protective dielectric strip comprises one of silicon oxide, silicon nitride, or silicon oxynitride, or any combination thereof.

9. The black matrix structure according to claim 7, wherein
a ramp angle of the black matrix strip ranges from 70 degrees to 80 degrees.

10. The black matrix structure according to claim 9, wherein
a first cross section of the black matrix strip is in a shape of a chamfered isosceles trapezoid, wherein a vertex angle of the chamfered isosceles trapezoid is a circular arc chamfer and is an angle between an upper base of the chamfered isosceles trapezoid and a leg of the chamfered isosceles trapezoid, and the first cross section is parallel to a widthwise direction of the black matrix strip and perpendicular to a lengthwise direction of the black matrix strip.

11. The black matrix structure according to claim 10, wherein
the vertex angle of the chamfered isosceles trapezoid ranges from 120 degrees to 130 degrees.

12. A display substrate, comprising:
a base substrate;
the black matrix according to claim 7;
a color filter layer on the base substrate, wherein a filter structure of the color filter layer is disposed in an opening area of the black matrix structure; and
a protective layer on a side of the color filter layer distal from the base substrate.

13. The display substrate according to claim 12, wherein the black matrix strip is a laminated structure formed by superimposing a light shielding strip and a protective dielectric strip, wherein an orthographic projection of the protective dielectric strip on the base substrate is within an orthographic projection of the light shielding strip on the base substrate, and the light shielding strip is disposed between the protective dielectric strip and the base substrate.

14. The display substrate according to claim 13, wherein a material of the protective dielectric strip comprises one of silicon oxide, silicon nitride, or silicon oxynitride, or any combination thereof.

15. The display substrate according to claim 12, wherein a ramp angle of the black matrix strip ranges from 70 degrees to 80 degrees.

16. The display substrate according to claim 15, wherein a first cross section of the black matrix strip is in a shape of a chamfered isosceles trapezoid, wherein a vertex angle of the chamfered isosceles trapezoid is a circular arc chamfer and is an angle between an upper base of the chamfered isosceles trapezoid and a leg of the chamfered isosceles trapezoid, and the first cross section is parallel to a widthwise direction of the black matrix strip and perpendicular to a lengthwise direction of the black matrix strip.

17. The display substrate according to claim 16, wherein the vertex angle of the chamfered isosceles trapezoid ranges from 120 degrees to 130 degrees.

18. A display device, comprising the display substrate according to claim 12.

\* \* \* \* \*